H. V. AIKEN.
Lubricators.
No. 139,286.  Patented May 27, 1873.
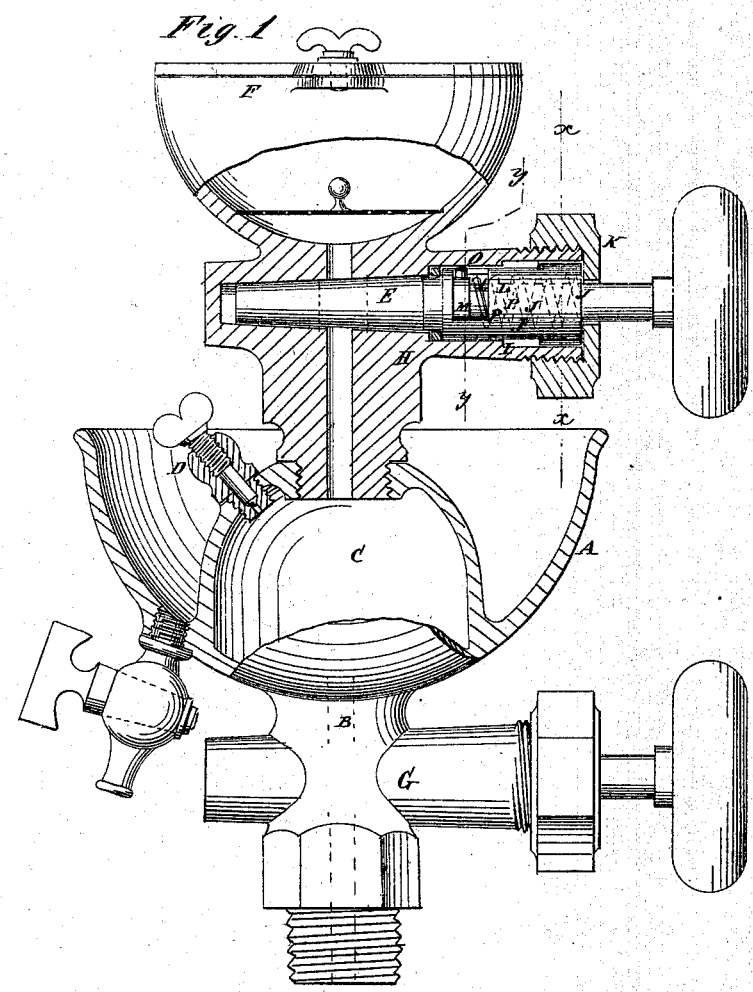
Witnesses:
Inventor:
H. V. Aiken
Per
Attorneys.

UNITED STATES PATENT OFFICE.

HENRY V. AIKEN, OF GIBSONBURG, PENNSYLVANIA.

IMPROVEMENT IN LUBRICATOR.

Specification forming part of Letters Patent No. 139,286, dated May 27, 1873; application filed April 12, 1873.

*To all whom it may concern:*

Be it known that I, HENRY V. AIKEN, of Gibsonburg, in the county of Luzerne and State of Pennsylvania, have invented a new and useful Improvement in Lubricators, of which the following is a specification:

The invention consists in the improvement of lubricators as hereinafter fully described and pointed out in the claim.

Figure 1 is partly a side elevation and partly a sectional elevation of a lubricator, constructed according to my invention. Fig. 2 is a section through one of the cocks on the line $x\,x$ of Fig. 1; and Fig. 3 is a section on the line $y\,y$.

Similar letters of reference indicate corresponding parts.

A represents a large drip-cup on the standard or body B of the lubricator below the middle oil-chamber C to secure the drip from above, whether escaping from the blow-off cock D, leaking from the cock E, or overflowing from reservoir F; the object being to economize the oil and prevent it from soiling the engine. For packing the cocks E and G I have a leather or other suitable flexible packing-jacket, H, fitted to the shoulder at the bottom of the chamber I, and against this I fit a tubular follower, J, which is pressed firmly against the washer by the cap K to pack it oil-tight against the cock; and inside the follower I arrange a spring, L, between cap K and a shoulder, M, of the cock to press it snugly into its seat, but not so as to bind. A pin, O, in the cock stops the turning of it by coming against the end walls of the slot P in the follower to arrest the cock when opened and closed. The follower is prevented from turning by ribs Q fitting in groove F of the inner wall of the chamber I.

Having thus described my invention, what I claim as new, and desire to secure by Letters Patent, is—

The lubricator as constructed, having the oil-drip cup formed with the body of and surrounding the central oil-chamber C, as and for the purpose set forth.

HENRY V. AIKEN.

Witnesses:
A. H. BOCIS,
E. H. VANDENBURG.